United States Patent
Kim et al.

(10) Patent No.: US 7,329,370 B2
(45) Date of Patent: Feb. 12, 2008

(54) TRANSPARENT POLYCRYSTALLINE CERAMIC SCINTILLATORS AND METHODS OF PREPARING THE SAME

(75) Inventors: Young Kwan Kim, Seoul (KR); Shiwoo Lee, Daejeon (KR); Do Kyung Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 213 days.

(21) Appl. No.: 10/883,034

(22) Filed: Jul. 2, 2004

(65) Prior Publication Data

US 2005/0087724 A1    Apr. 28, 2005

(30) Foreign Application Priority Data

Oct. 22, 2003  (KR)  ............... 10-2003-0073972

(51) Int. Cl.
*C09K 11/78* (2006.01)

(52) U.S. Cl. ............... 252/301.4 R; 501/152; 264/21

(58) Field of Classification Search .............. None
See application file for complete search history.

(56) References Cited

U.S. PATENT DOCUMENTS

| | | | |
|---|---|---|---|
| 3,715,611 A | 2/1973 | De Mesquita et al. | |
| 4,185,201 A | 1/1980 | Stevels | |
| 4,208,611 A | 6/1980 | Watanabe et al. | |
| 4,473,513 A * | 9/1984 | Cusano et al. | 264/1.22 |
| 4,783,596 A * | 11/1988 | Riedner et al. | 250/483.1 |
| 5,100,598 A * | 3/1992 | Dole et al. | 264/1.22 |
| 5,114,702 A * | 5/1992 | Pederson et al. | 423/639 |
| 5,116,559 A * | 5/1992 | Dole et al. | 264/1.22 |
| 6,979,415 B1* | 12/2005 | Krishna et al. | 252/301.4 P |

FOREIGN PATENT DOCUMENTS

| | | |
|---|---|---|
| JP | 53-64685 A | 6/1978 |
| JP | 54-62988 A | 5/1979 |
| JP | 56-5883 A | 1/1981 |
| JP | 56-155283 A | 12/1981 |
| JP | 57-131278 A | 8/1982 |
| JP | 4-214788 A | 8/1992 |
| JP | 2002-80847 A | 3/2002 |
| WO | WO 03/083010 A1 | 10/2003 |

OTHER PUBLICATIONS

Greskovich et al, "Ceramic Scintillators for Advanced, Medical X-ray Detectors", Am. Ceram. Soc. Bull. 71:1120-1130, 1992.*

(Continued)

*Primary Examiner*—C. Melissa Koslow
(74) *Attorney, Agent, or Firm*—Sterne, Kessler, Goldstein & Fox P.L.L.C.

(57) ABSTRACT

This invention relates to transparent polycrystalline ceramic scintillators and methods of preparing the same. The invention also relates to gadolinium-yttrium oxide ceramic scintillators with europium added as an activator, which are optically transparent and whose cubic structures are maintained even when gadolinium oxide constitutes more than 50% of the scintillator. The scintillators of the present invention also have high light yield due to excellent luminescent characteristics in the visible light region.

5 Claims, 3 Drawing Sheets

Content of Y (x, in $Gd_{1.94-x}Y_xEu_{0.06}O_3$)

OTHER PUBLICATIONS

Greskovich, C.D., et al., "Ceramic Scintillators for Advanced, Medical X-Ray Detectors," *Am. Ceram. Soc. Bull.* 71:1120-1130, The American Ceramic Society (1992).

Dialog File 351, Accession No. 2929980, Derwent WPI English language abstract for JP 59-027283 A (listed on accompanying PTO/SB/08A as document FP6).

Dialog File 351, Accession No. 4142333, Derwent WPI English language abstract for JP 62-177474 A (listed on accompanying PTO/SB/08A as document FP7).

Patent Abstracts of Japan, English language abstract of JP 64-038491 (listed on accompanying PTO/SB/08A as document FP8).

Patent Abstracts of Japan, English language abstract of JP 64-054092 (listed on accompanying PTO/SB/08A as document FP9).

Dialog File 351, Accession No. 5027101, Derwent WPI English language abstract for JP 4-507230 W (listed on accompanying PTO/SB/08A as document FP11).

Patent Abstracts of Japan, English language abstract of JP 05-017224 (listed on accompanying PTO/SB/08A as document FP12).

Patent Abstracts of Japan, English language abstract of JP 05-085824 (listed on accompanying PTO/SB/08A as document FP13).

Patent Abstracts of Japan, English language abstract of JP 07-179852 (listed on accompanying PTO/SB/08A as document FP14).

Patent Abstracts of Japan, English language abstract of JP 2002-038150 (listed on accompanying PTO/SB/08A as document FP15).

Patent Abstracts of Japan, English language abstract of JP 2002-226853 (listed on accompanying PTO/SB/08A as document FP17).

Patent Abstracts of Japan, English language abstract of JP 2002-309245 (listed on accompanying PTO/SB/08A as document FP18).

Patent Abstracts of Japan, English language abstract of JP 2003-082346 (listed on accompanying PTO/SB/08A as document FP19).

Patent Abstracts of Japan, English language abstract of JP 2003-089517 (listed on accompanying PTO/SB/08A as document FP20).

Patent Abstracts of Japan, English language abstract of JP 2003-344545 (listed on accompanying PTO/SB/08A as document FP22).

International Search Report for International Application No. PCT/JP03/03821, Japanese Patent Office, Japan, mailed on Jun. 3, 2003.

Shigeo et al., English language abstract for JP 56-005883, published Jan. 1, 1981, Japanese Patent Office (which was submitted as Document FP3 in an Information Disclosure statement filed Mar. 28, 2007).

Kenji, et al., English language abstract for JP 56-155283, published Dec. 1, 1981, Japanese Patent Office (which was submitted as Document FP4 in an Information Disclosure Statement filed Mar. 28, 2007).

Kenji, et al., English language abstract for JP 57-131278, published Aug. 14, 1982, Japanese Patent Office (which was submitted as Document FP5 in an information Disclosure Statement filed Mar. 28, 2007).

Takashi, et al., English language abstract for JP 2002-080847, published Mar. 22, 2002, Japanese Patent Office (which was submitted as Document FP16 in an Information Disclosure Statement filed Mar. 28, 2007).

* cited by examiner

TRANSPARENT POLYCRYSTALLINE CERAMIC SCINTILLATORS AND METHODS OF PREPARING THE SAME

This application claims priority to Korean Patent Application No. 10-2003-0073972, filed Oct. 22, 2003, which is incorporated by reference herein in its entirety.

BACKGROUND OF THE INVENTION

1. Field of the Invention

This invention relates to transparent polycrystalline ceramic scintillators and methods of preparing the same. The invention also relates to gadolinium-yttrium oxide ceramic scintillators with europium added as an activator, which are optically transparent and whose cubic structures are maintained even when gadolinium oxide constitutes more than 50% of the scintillator. The scintillators of the present invention also have high light yield due to excellent luminescent characteristics in the visible light region.

2. Related Art

A scintillator is a material that emits visible light by absorbing radiation such as X-rays and gamma rays. Occasionally normal phosphor is used as a scintillator, but in most cases high density and high atomic number materials are used or added. Scintillators are used for various purposes, e.g., measuring the effects of radiation as a quarantine treatment, as industrial references, as medical care diagnostics, etc. However, the most typical application is in medical computerized tomography (CT-scanner). In a CT-scanner, the scintillator emits visible light by absorbing radiation, and a photon sensor, e.g., a scintillator-charge-coupled device (CCD), transforms the visible light into an electrical signal.

Generally, computerized tomography (CT)-scanners use single crystal $CdWO_4$ as scintillators. Scintillators require high optical transmittance to enhance the photon transmission efficiency to the photon sensor.

Polycrystalline ceramic scintillators have been developed to overcome the shortcomings of single crystal scintillators and to acquire better and preferred physical properties. Existing polycrystalline ceramic scintillators fulfill these requirements, however it is difficult to achieve optically transparent conditions through conventional ceramic manufacturing processes. This difficulty in manufacturing conventional transparent ceramic scintillators is one of the most limiting factors of ceramic scintillators.

Among various ceramic scintillators, gadolinium-yttrium oxide ceramic scintillator, with europium added as an activator, is considered to be the most representative substance that overcomes these difficulties. This scintillator is based on yttrium oxide, which is known to be sinterable to transparent ceramic. A typical scintillator has 3% europium oxide and 30% gadolinium oxide substituted into the host material, yttrium oxide. Europium oxide functions as a luminescent activator, and gadolinium oxide functions to elevate the absorption coefficient for the radiation, e.g., X-rays, by substituting yttrium oxide. Substituting high density and high atomic number gadolinium oxide into yttrium oxide, and adding europium oxide as the activator, creates a scintillator that efficiently absorbs radiation.

The problem with conventional gadolinium-yttrium oxide is that the quantity of gadolinium oxide substituted is limited to less than 50% (Greskovich et al., *American Ceramic Society Bulletin* 71:1120-1130 (1992)). In scintillators with high gadolinium oxide content, the crystalline phase is changed from cubic to monoclinic. Monoclinic ceramics have low transmittance and low luminescent characteristic.

Thus, to enhance the light yield, a need exists for a scintillator containing 50% or more gadolinium oxide that maintains its cubic crystal structure.

SUMMARY OF THE INVENTION

This invention relates to transparent polycrystalline ceramic scintillators and methods of preparing the same. The invention also relates to gadolinium-yttrium oxide ceramic scintillators with europium added as an activator, which are optically transparent and whose cubic structures are maintained even when gadolinium oxide constitutes more than 50% of the scintillator. The scintillators of the present invention have high light yields due to excellent luminescent characteristics in the visible light region.

DETAILED DESCRIPTION

Figure 1:
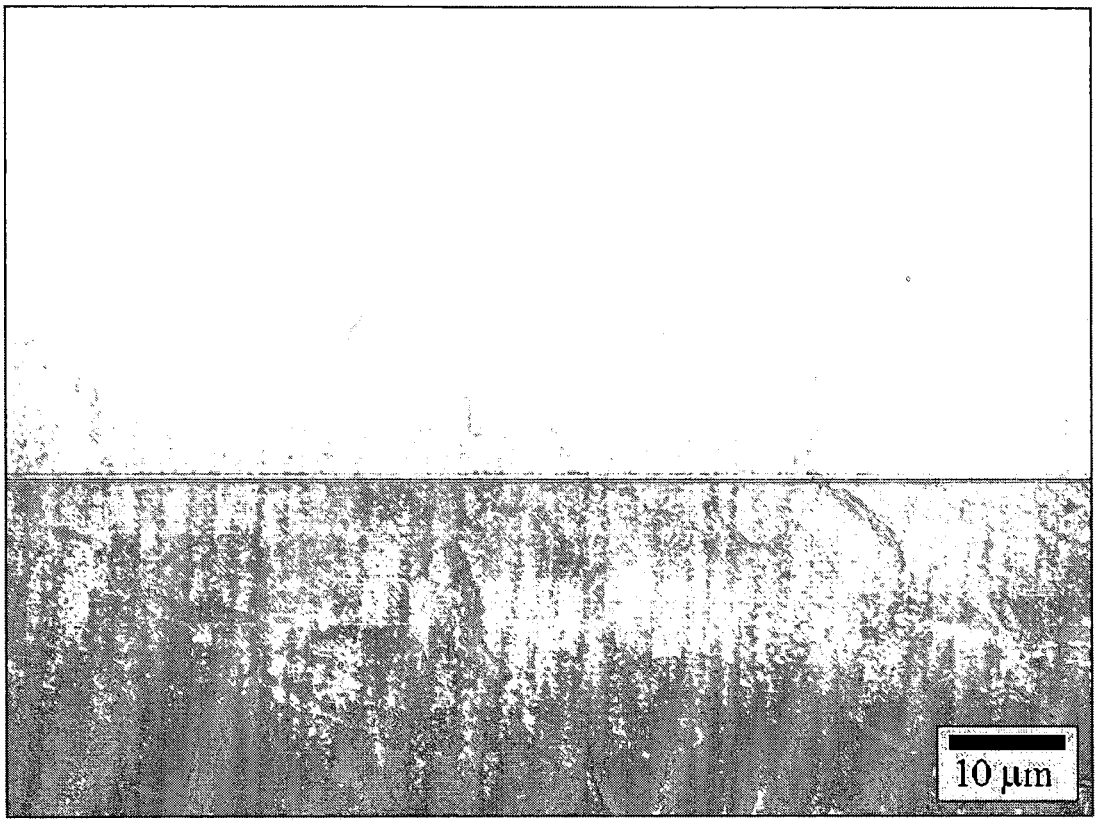
FIG. 1 shows a microstructure of the ceramic scintillator of the present invention observed through an optical microscope.

The present invention is directed to providing ceramic scintillators that are optically transparent and whose cubic structures are maintained even when gadolinium oxide exceeds 50%, and whose light yields are very high due to excellent luminescent characteristics in the visible light region.

The present invention is directed to transparent polycrystalline ceramic scintillators comprising gadolinium oxide ($Gd_2O_3$), yttrium oxide ($Y_2O_3$), and europium oxide ($Eu_2O_3$) as an activator, wherein the transparent polycrystalline ceramic scintillators have cubic crystal structures and contain greater than about 50% (mole fraction) gadolinium oxide ($Gd_2O_3$). In some embodiments, the transparent scintillators can contain about 50% to about 77% (mole fraction) gadolinium oxide ($Gd_2O_3$).

The present invention is also directed to methods of manufacturing the transparent polycrystalline ceramic scintillators of the present invention.

The present invention provides transparent polycrystalline ceramic scintillators that contain about 50% to about 77% (mole fraction) gadolinium oxide ($Gd_2O_3$), yttrium oxide ($Y_2O_3$), and europium oxide ($Eu_2O_3$) as an activator, wherein the scintillators are characterized as a cubic system.

Transparent polycrystalline ceramic scintillators of the present invention can be manufactured by a method comprising (a) performing a spontaneous combustion reaction of gadolinium nitrate, yttrium nitrate, and europium nitrate together with glycine, (b) grinding the product of the combustion reaction of (a) to produce a powder, (c) heat-treating the powder of (b) to remove any unreacted organic components, and (d) sintering the product of the heat-treating of (c). In some embodiments, the method of the present invention can further comprise (e) oxidizing the product of the sintering of (d).

The transparent polycrystalline ceramic scintillators of the present invention comprise yttrium oxide ($Y_2O_3$) as a host material substituted with gadolinium oxide ($Gd_2O_3$), and some quantity of europium oxide ($Eu_2O_3$) as an activator. Gadolinium oxide plays a role in enhancing the absorption coefficient for X-rays (X-ray stopping power) by substituting for yttrium oxide. At least 50% (mole fraction) gadolinium oxide is required in the scintillator to enhance light yield. In some embodiments, gadolinium oxide can be up to about 77% (mole fraction) and the cubic structure, optical transmittance and luminescent characteristics of the scintillator are still excellently maintained. Light yield increases as long as the gadolinium oxide content in the scintillator is not greater than about 77%. However, as the gadolinium content exceeds about 77%, the crystalline phase is changed to monoclinic, the luminescent spectrum is changed to a curve with peaks at 615 nm and 623 nm, and not at 610 nm, and the luminescent light yield decreases rapidly.

Europium oxide ($Eu_2O_3$) functions as a luminescent activator, and its percentage in the scintillator can vary. In some embodiments, about 1.0% to about 5.0% (mole fraction) of europium oxide can be present in the scintillator of the invention. If less than about 1% of europium oxide is added, then europium oxide has a weakened role as an activator and luminescent characteristics may be reduced. If the europium oxide is greater than about 5%, luminescent characteristics may decrease due to the electron transition between activators. The crystalline phase of a ceramic scintillator with about 1.0% to about 5.0% (mole fraction) of europium oxide should be cubic and produce high transmittance and luminescent light yield. In some embodiments, the scintillator contains about 0.1% to about 10.0% (mole fraction) europium oxide.

In the present invention, GNP (Glycine Nitrate Process) was used because it proved to have more advantages in selectivity of composition compared to the conventional co-precipitation method for the synthesis of the powder of the present invention. Therefore, the modification of the scinitillator composition for a specific application is easier.

By dissolving the metal nitrate and glycine in an appropriate solvent, heating the dissolved nitrate and glycine, and evaporating the solvent, an oxide is made through a spontaneous combustion reaction. The reaction temperature required for a spontaneous combustion reaction depends on the ratio of nitrate and the fuel used. The proper ratio can be determined using an electrovalence calculation method. That is, the input quantities of metal nitrates (gadolinium nitrate, yttrium nitrate and europium nitrate) as raw materials, and glycine as a fuel, can be calculated using a reaction formula obtained by equalizing the total oxidation-valence of nitrates and the total reduction-valence of glycine.

Any suitable solvent capable of dissolving both metal nitrate and glycine can be used. Examples of solvents include, but are not limited to, water, ethanol and the like.

The particles manufactured by the method of the present invention are nanocrystalline powders. In some embodiments, the nanocrystalline powder particles have an average size of less than about 100 nm. In some embodiments, the nanocrystalline powder particles have an average size of about 60 nm and have a narrow size distribution. If the powders form sub-micron sized secondary particles through processes like wet ball milling, they can have higher forming ability and sinterability.

Usually, powders produced through combustion synthesis contain small quantities of impurities. Unreacted organic components generated by incomplete combustion during the combustion reaction, such as $CO$, $CO_2$, $N_2$, $HNO_3$, $OH$, etc., can prevent achievement of the maximum theoretical density by causing pores in the final microstructure. These impurities can be eliminated through heat-treating at a pre-set temperature. Ideally, impurities can be eliminated more effectively by heat-treating at about 300° C. to about 800° C. for about 1 hour to about 48 hours under vacuum and/or atmospheric conditions.

Sinterability of the powder is important for manufacturing the transparent ceramic scintillator. Sinterability depends on the size and shape of the powder particle, impurities, formation of the proper phase, etc.

Various sintering temperatures can be used to synthesize the ceramic scintillators of the present invention. In some embodiments, the sintering is preceded with a pressure of about 20 MPa to about 50 MPa. Under such conditions, sintering is accomplished by raising the temperature to about 1,300° C. to about 1,700° C. and maintaining this temperature for about 1 hour to about 4 hours while flowing argon gas or while under vacuum. The pellet can look dark-colored due to the sintering environment. In some embodiments, the pellet can go through additional heat treatments to remove the color and to oxidize the scintillator.

Various conditions can be used for the oxidation process. In some embodiments, oxidation can be carried out by heat-treating at about 800° C. to about 1250° C. under an atmospheric environment.

FIG. 1 is an optical micrograph of a ceramic scintillator produced through the above process. There exists few pores in the grain boundary and this decrease of pores results in increased theoretical density and higher transmittance for the scintillator.

Figure 2:
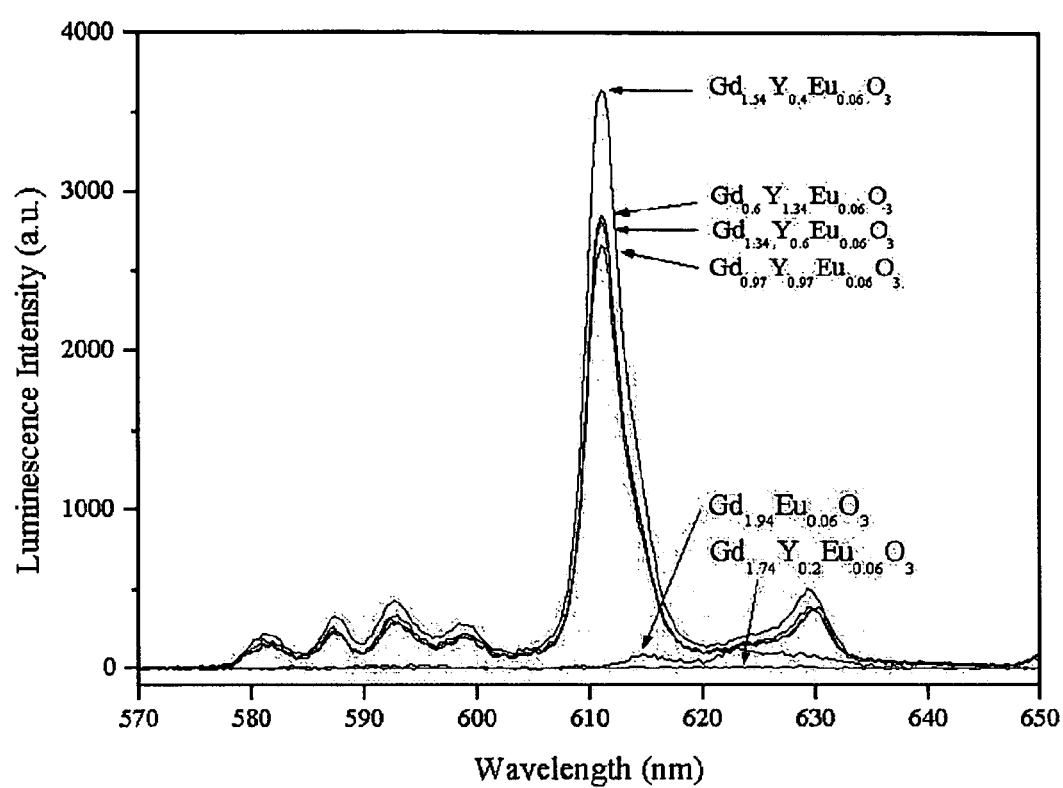
FIG. 2 shows luminescent spectra by the emission wavelength of a ceramic scintillator prepared by the method of the present invention using a 100 keV X-ray source.
Figure 3:
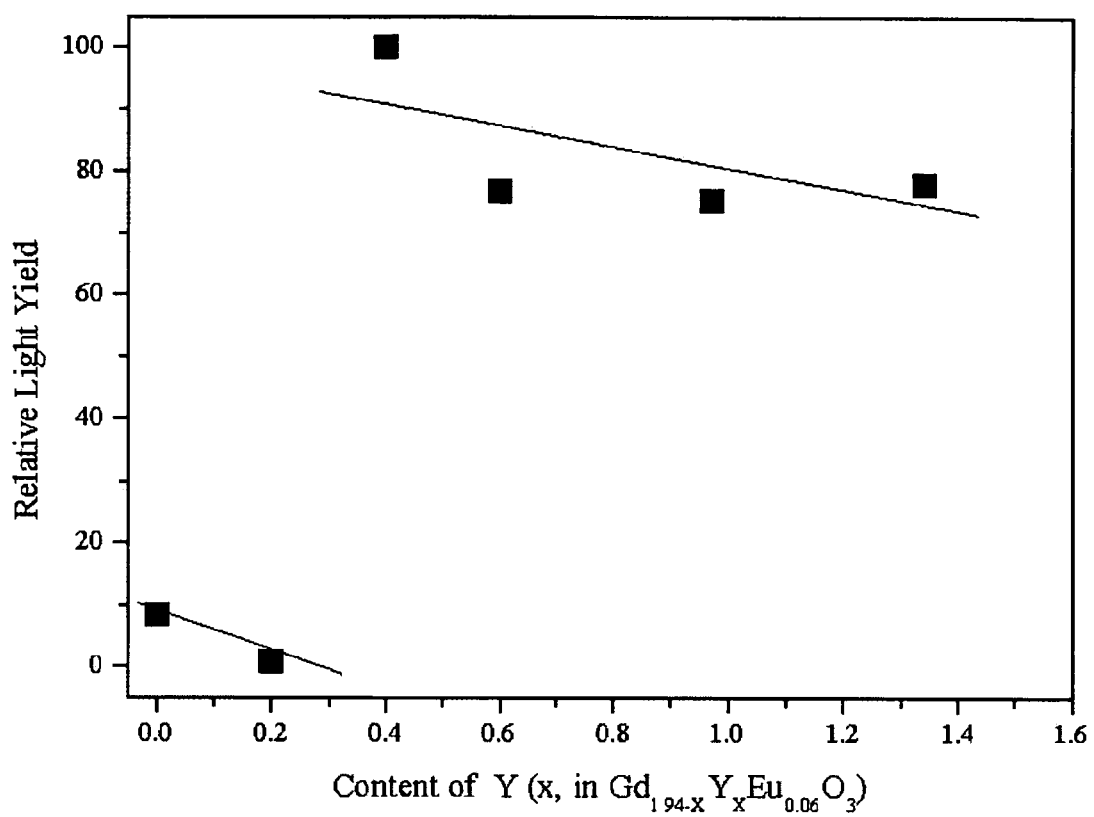
FIG. 3 shows a light yield curve derived from the luminescent spectra of a ceramic scintillator of the present invention.

For powders produced from the processes of the present invention, the crystalline phase maintains a cubic structure and is optically transparent even when the percentage of gadolinium oxide exceeds 50% (mole fraction), and the light yield is very high due to excellent luminescent characteristics in the visible light region. FIG. 2 depicts the luminescent spectrum curve according to the emission wavelength of the final ceramic scintillator obtained by the above manufacturing process. FIG. 2 shows that the spectrum of each scintillator overlaps and the highest peak of luminescent spectrum is observed at the wavelength of 610 nm. The spectrum coincides with the results of yttrium-based phosphor with europium added as activator. From this, it is understood that europium within the scintillator plays a role as the luminescent activator. FIG. 3 depicts the light yield curve obtained from the luminescent spectra of the above ceramic scintillators. FIG. 3 shows that the cubic structure, optical transmittance, and luminescent characteristic are maintained until the percentage of gadolinium oxide reaches 77% (mole fraction). Adding more than 77% gadolinium oxide, however, changes the crystalline phase to the monoclinic, changes the highest peaks of the luminescent spectrum observed to 615 nm and 623 nm, and decreases the light yield. Thus, the highest light yield is observed when gadolinium oxide is 77% (mole fraction), which is twice as high as the single crystal scintillators generally used in medical computerized tomography (CT Scanners).

Having generally described this invention, a further understanding can be obtained by reference to the examples provided herein. These examples are for purposes of illustration only and are not intended to be limiting unless otherwise specified.

EXAMPLE 1

Synthesis of Ceramic Scintillator
($Gd_{1.54}Y_{0.4}Eu_{0.06}O_3$)

Gadolinium nitrate (13.9019 g, 0.0308 mole), yttrium nitrate (3.0641 g, 0.008 mole) and europium nitrate (0.5137 g, 0.0012 mole) were melted together with glycine (5.0798 g, 0.0667 mole) in 40 ml of distilled water (1 molar concentration) to form a solution. Viscosity increased gradually as the solution was heated on a hot-plate at over 400° C. for 10 minutes, transforming the liquid into an oxide powder through the self-sustaining combustion reaction.

The oxide powder was treated by ball milling at 50 rpm for 24 hours with a polypropylene vessel and zirconia balls using isopropyl alcohol as a solvent. The powder from this process was then kept in a hood for 24 hours to evaporate the solvent and then dried in an oven at 50° C. for more than 48 hours. After mounting the dried powder to a tube furnace (with both ends of tube furnace blocked and under vacuum conditions), the powder was heated and kept at 400° C. for 4 hours while keeping the vacuum condition at around 100 mtorr. While holding the temperature at 400° C., the furnace was vented to air and the vacuum pump was turned off. After additional heating at 400° C. for 4 hours, the temperature of the tube furnace was lowered to room temperature.

After mounting the powder into a graphite sleeve for hot-pressing sintering, a pressure of 5 MPa was applied to both sides of the powder compact. After the temperature was elevated to 1400° C. while flowing argon gas, the pressure was raised to 30 MPa and maintained there for 2 hours. After the sintering, the pellet was oxidized for 2 hours at 1000° C. in atmospheric air.

EXAMPLE 2

Synthesis of Ceramic Scintillator
($Gd_{1.34}Y_{0.6}Eu_{0.06}O_3$)

A ceramic scintillator was produced under the same conditions and through the same processes as in Example 1, except gadolinium nitrate (12.0964 g, 0.0268 mole), yttrium nitrate (4.5961 g, 0.012 mole) and europium nitrate (0.5137 g, 0.0012 mole) were melted together with glycine (5.0798 g, 0.0667 mole) in 40 ml of distilled water.

EXAMPLE 3

Synthesis of Ceramic Scintillator
($Gd_{0.97}Y_{0.97}Eu_{0.06}O_3$)

A ceramic scintillator was produced under the same conditions and through the same processes as in Example 1, except gadolinium nitrate (8.7564 g, 0.0194 mole), yttrium nitrate (7.404 g, 0.0194 mole) and europium nitrate (0.5137 g, 0.0012 mole) were melted together with glycine (45.0798 g, 0.0667 mole) in 40 ml of distilled water.

EXAMPLE 4

Synthesis of Ceramic Scintillator
($Gd_{1.74}Y_{0.2}Eu_{0.06}O_3$)

A ceramic scintillator was produced under the same conditions and through the same processes as in Example 1, except gadolinium nitrate (15.7073 g, 0.0348 mole), yttrium nitrate (1.5320 g, 0.004 mole) and europium nitrate (0.5137 g, 0.0012 mole) were melted together with glycine (5.0798 g, 0.0667 mole) in 40 ml of distilled water.

EXAMPLE 5

Synthesis of Ceramic Scintillator
($Gd_{0.6}Y_{1.34}Eu_{0.06}O_3$)

A ceramic scintillator was produced under the same conditions and through the processes as in Example 1, except gadolinium nitrate (5.4163 g, 0.012 mole), yttrium nitrate (10.2647 g, 0.0268 mole) and europium nitrate (0.5137 g, 0.0012 mole) were melted together with glycine (5.0798 g, 0.0667 mole) in 40 ml of distilled water.

EXAMPLE 6

Synthesis of Ceramic Scintillator
($Gd_{1.94}Eu_{0.06}O_3$)

A ceramic scintillator was produced under the same conditions and through the same processes as in Example 1, except gadolinium nitrate (17.5128 g, 0.0388 mole) and europium nitrate (0.5137 g, 0.0012 mole) were melted together with glycine (5.0798 g, 0.0667 mole) in 40 ml of distilled water.

Effect of the Invention

The microstructures, luminescent spectrum and light yield of the ceramic scintillators in Examples 1, 2, and 3 were measured. As depicted in FIGS. 1, 2 and 3, scintillators having gadolinium oxide concentrations of 77%, 67% and 50% maintained their cubic structure, optical transmittance and high light yield due to excellent luminescent characteristics in the visible light region.

Accordingly, the ceramic scintillators of the present invention have highly enhanced light yields compared to conventional scintillators and are expected to be used more effectively in medical and industrial radiation detectors.

What is claimed is:

1. A transparent polycrystalline ceramic scintillator comprising gadolinium oxide ($Gd_2O_3$), yttrium oxide ($Y_2O_3$), and europium oxide ($Eu_2O_3$) as an activator, wherein the scintillator contains greater than 50% to about 77% (mole fraction) gadolinium oxide ($Gd_2O_3$), and wherein the scintillator maintains a cubic crystal structure, and wherein the scintillator has a relative light yield of 75% to 102%.

2. The scintillator of claim 1, wherein the scintillator contains about 0.1% to about 10.0% (mole fraction) europium oxide.

3. A method of preparing a polycrystalline ceramic scintillator, the method comprising:
   (a) performing a spontaneous combustion reaction of gadolinium nitrate, yttrium nitrate, and europium nitrate, together with glycine;
   (b) grinding the product of the combustion reaction of (a) to produce a powder;
   (c) heat-treating the powder of (b) to remove any unreacted organic components;
   (d) sintering the product of the heat-treating of (c); and
   (e) oxidizing the product of the sintering of (d) by heat-treating at about 800° C. to about 1250° C. in atmospheric air.

4. A method of preparing a polycrystalline ceramic scintillator, the method comprising:

(a) performing a spontaneous combustion reaction of gadolinium nitrate, yttrium nitrate, and europium nitrate, together with glycine;

(b) grinding the product of the combustion reaction of (a) to produce a powder;

(c) heat-treating the powder of (b) to remove any unreacted organic components, wherein the heat-treating is carried out at a temperature of about 300° C. to about 800° C. for about 1 hour to about 48 hours under vacuum or in atmospheric air;

(d) sintering the product of the heat-treating of(c); and (e) oxidizing the product of the sintering of (d) by heat-treating at about 800° C. to about 1250° C. in atmospheric air.

5. A method of preparing a polycrystalline ceramic scintillator, the method comprising:

(a) performing a spontaneous combustion reaction of gadolinium nitrate, yttrium nitrate, and europium nitrate, together with glycine;

(b) grinding the product of the combustion reaction of (a) to produce a powder;

(c) heat-treating the powder of (b) to remove any unreacted organic components;

(d) sintering the product of the heat-treating of (c), wherein the sintering is carried out at about 1,300° C. to about 1,700° C. under vacuum or argon atmosphere, where the sintering is performed under a pressure of about 20 MPa to about 50 MPa; and (e) oxidizing the product of the sintering of (d) by heat-treating at about 800° C. to about 1250° C. in atmospheric air.

* * * * *